US012387059B2

United States Patent
Thoniparambil et al.

(10) Patent No.: US 12,387,059 B2
(45) Date of Patent: Aug. 12, 2025

(54) IDENTIFYING ZONES OF INTEREST IN TEXT TRANSCRIPTS USING DEEP LEARNING

(71) Applicant: Capital One Services, LLC, McLean, VA (US)

(72) Inventors: Akshay Aravindakshan Thoniparambil, Bangalore (IN); Naman Gupta, Jaipur (IN); Manish Agarwal, Bangalore (IN); Sourav Choudhary, Samastipur (IN)

(73) Assignee: Capital One Services, LLC, McLean, VA (US)

( * ) Notice: Subject to any disclaimer, the term of this patent is extended or adjusted under 35 U.S.C. 154(b) by 299 days.

(21) Appl. No.: 17/554,606

(22) Filed: Dec. 17, 2021

(65) Prior Publication Data
US 2023/0196035 A1   Jun. 22, 2023

(51) Int. Cl.
| | |
|---|---|
| G06F 40/58 | (2020.01) |
| G06F 16/334 | (2025.01) |
| G06F 16/93 | (2019.01) |
| G06F 40/216 | (2020.01) |
| G06N 3/08 | (2023.01) |

(52) U.S. Cl.
CPC .......... *G06F 40/58* (2020.01); *G06F 16/3344* (2019.01); *G06F 16/93* (2019.01); *G06F 40/216* (2020.01); *G06N 3/08* (2013.01)

(58) Field of Classification Search
CPC .................................................... G06N 20/00
See application file for complete search history.

(56) References Cited

U.S. PATENT DOCUMENTS

| | | | | |
|---|---|---|---|---|
| 7,606,714 | B2* | 10/2009 | Williams | H04M 3/493 |
| | | | | 704/275 |
| 9,477,752 | B1* | 10/2016 | Romano | G06F 16/367 |
| 9,767,165 | B1 | 9/2017 | Tacchi | |
| 9,779,081 | B2 | 10/2017 | Simard et al. | |
| 9,922,025 | B2 | 3/2018 | Cross et al. | |

(Continued)

OTHER PUBLICATIONS

Gildea et al. "Topic-based Language Models using EM". Sixth European Conference on Speech Communication and Technology, 1999 (Year: 1999).*
Levine et al. "PMI-Masking: Principled Masking of Correlated Spans". arXiv:2010.01825v1 [cs.LG] Oct. 5, 2020 (Year: 2020).*
Devlin et al., "BERT: Pre-training of Deep Bidirectional Transformers for Language Understanding", Cornell University [online], Submitted Oct. 11, 2018, 16 pages.

(Continued)

*Primary Examiner* — Jesse S Pullias
(74) *Attorney, Agent, or Firm* — KDW Firm PLLC

(57) ABSTRACT

Systems, methods, and computer program products for identifying zones of interest in text transcripts. An application may receive input specifying a text statement type and determine a plurality of heuristics for identifying statements of the statement type in transcripts. The application may determine, based on a first heuristic, a first text statement of the statement type. The application may generate, based on a clustering algorithm, a plurality of additional statements of the statement type. The application may receive a first text transcript. The application may identify, based on a second heuristic, a first text statement in the first text transcript, where the first text transcript statement is of the statement type. The application may generate a graphical indication that the first text transcript statement is of the statement type, and display the first transcript statement and the graphical indication on a display.

14 Claims, 9 Drawing Sheets

(56) References Cited

U.S. PATENT DOCUMENTS

| | | | |
|---|---|---|---|
| 10,754,883 B1* | 8/2020 | Kannu | G06F 16/36 |
| 11,023,675 B1 | 6/2021 | Neervannan | |
| 11,227,183 B1 | 1/2022 | Connors et al. | |
| 11,294,974 B1 | 4/2022 | Shukla et al. | |
| 2004/0210443 A1* | 10/2004 | Kuhn | G10L 15/22 |
| | | | 704/E15.04 |
| 2012/0259801 A1* | 10/2012 | Ji | G06N 20/00 |
| | | | 706/12 |
| 2013/0346424 A1 | 12/2013 | Zhang et al. | |
| 2017/0353605 A1 | 12/2017 | Dumaine | |
| 2018/0121539 A1 | 5/2018 | Ciulla | |
| 2019/0139551 A1* | 5/2019 | Steelberg | G06N 20/00 |
| 2019/0163817 A1 | 5/2019 | Milenova | |
| 2020/0302011 A1 | 9/2020 | Mishra | |
| 2020/0410012 A1 | 12/2020 | Moon et al. | |
| 2021/0089971 A1 | 3/2021 | Grabau et al. | |
| 2021/0097472 A1 | 4/2021 | Inamdar et al. | |
| 2021/0157990 A1* | 5/2021 | Lima | H04L 51/02 |
| 2021/0158234 A1* | 5/2021 | Sivasubramanian | G10L 15/26 |
| 2022/0230116 A1 | 7/2022 | Dubey | |
| 2022/0293107 A1* | 9/2022 | Leaman | G06F 16/951 |
| 2022/0318485 A1 | 10/2022 | Narayanan | |
| 2022/0365955 A1 | 11/2022 | Ramamohan | |

OTHER PUBLICATIONS

Author Unknown, "Okapi BM25", Wikipedia the Free Encyclopedia [online], Retrieved from the Internet URL: <https://en.wikipedia.org/wiki/Okapi_BM25>, Retrieved on May 12, 2021, 4 pages.

Pagliardini et al., "Unsupervised Learning of Sentence Embeddings using Compositional n-Gram Features", NAACL 2018—Conference of the North American Chapter of the Association for Computational Linguistics, pp. 528-540.

Author Unknown, "DBSCAN", Wikipedia [online], Retrieved from Internet URL:<https://en.wikipedia.org/wiki/DBSCAN>, Retrieved on Dec. 14, 2021, 8 pages.

Author Unknown, "Sentiment analysis", Wikipedia [online], Retrieved from Internet URL:<https://en.wikipedia.org/wiki/Sentiment_analysis', Retrieved on Dec. 14, 2021, 16 pages.

Author Unknown, "How to Search Chat History", Published Jun. 3, 2021, Retrieved from Internet URL:<https://help.livehelpnow.net/1/kb/article/1584/how-to-search-chat-history>, Retrieved on Dec. 14, 2021, 2 pages.

Author Unknown, "Transcripts—Accessing transcripts", Olark [online], Retrieved from Internet URL:<https://www.olark.com/help/view-transcripts/>, Retrieved on Dec. 14, 2021, 8 pages.

* cited by examiner

FIG. 4

IDENTIFYING ZONES OF INTEREST IN TEXT TRANSCRIPTS USING DEEP LEARNING

CROSS-REFERENCE TO RELATED APPLICATIONS

This application is related to co-pending U.S. application Ser. No. 17/554,143, entitled "LEARNING FRAMEWORK FOR PROCESSING COMMUNICATION SESSION TRANSCRIPTS," filed on Dec. 17, 2021, which is hereby incorporated by reference in its entirety.

BACKGROUND

Often, users contact customer support agents for assistance. Agents may assist these users with various issues during these interactions. One or more text transcripts may be generated based on the interactions and stored for future use. However, these transcripts often have acronyms, shorthand notation, and varying word choices, making conventional solutions ineffective for searching. Furthermore, the transcripts often lack correct grammatical structure, punctuation, and other attributes that further exacerbate the difficulty in searches. Therefore, specific data points may be difficult to identify in the transcripts.

BRIEF SUMMARY

In one aspect, a method, includes receiving, by an application executing on a processor, input specifying a statement type, determining, by the application based on the statement type, a plurality of heuristics for identifying statements of the statement type in a plurality of text transcripts, determining, by the application based on a first heuristic of the plurality of heuristics, a first statement of the statement type, generating, by the application based on a clustering algorithm and the first statement, a plurality of additional statements of the statement type, receiving, by the application based on the first statement and the plurality of additional statements, a first text transcript of the plurality of text transcripts, identifying, by the application based on a second heuristic of the plurality of heuristics, a first transcript statement in the first text transcript, where the transcript statement is of the statement type, generating a graphical indication reflecting that the first transcript statement is of the statement type, and displaying at least the first transcript statement and the graphical indication on a display.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 4 illustrates an aspect of the subject matter in accordance with one embodiment.

DETAILED DESCRIPTION

Figure 1:
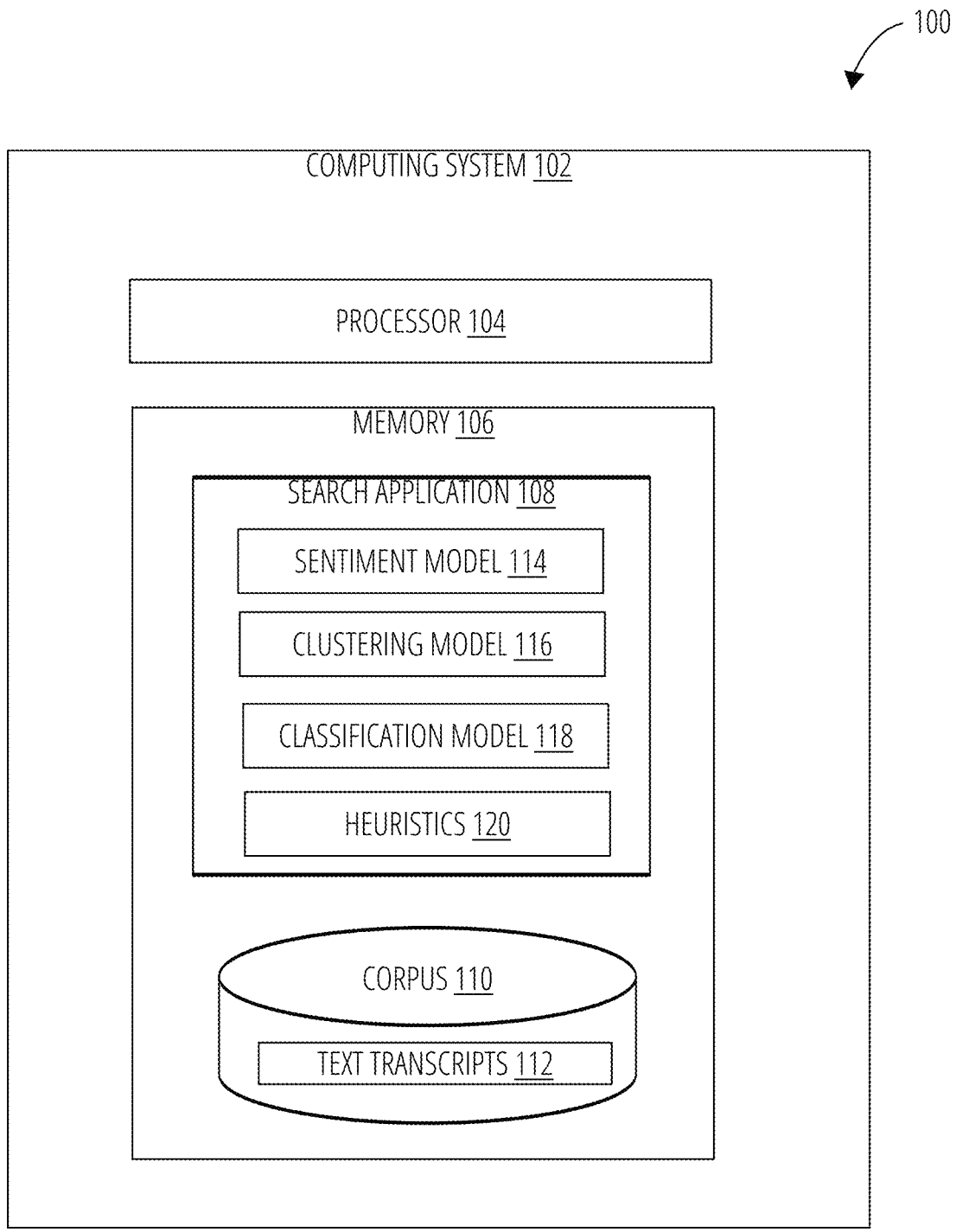
FIG. 1 illustrates an aspect of the subject matter in accordance with one embodiment.

Embodiments disclosed herein provide a deep learning framework for processing text transcripts of communication sessions between users and customer support agents. Generally, these transcripts may include vast amounts of information that can be used to identify gaps and opportunities in processes, workflows, and infrastructure design. Therefore, some users may need to identify specific zones of interest in the text transcripts, such as call reasons, resolutions for customer problems, negative statements, personal stories, and the like. Embodiments disclosed herein may identify and highlight these zones of interest using a deep learning framework. By identifying these zones of interest, different processes, products, and/or services may be repaired and/or improved.

More generally, embodiments disclosed herein may identify different zones of interest based on different heuristics, natural language processing, and deep learning techniques. For example, embodiments disclosed herein may use a trained statement clustering model to identify different variants of text statements and identify specific zones of interest associated with these varied statements in a text transcript. Furthermore, embodiments disclosed herein may use regular expression (regex) patterns to identify structured patterns and information associated with these patterns. Further still, embodiments disclosed herein may use a trained clustering model to identify relationships between terms in clusters. Doing so may allow these terms to be identified in a transcript and tagged as a relevant zone of interest. Embodiments disclosed herein may further use a classification model to classify statements related to a particular zone of interest.

Therefore, for example, a customer support agent may be assisting a caller with a technical problem. Advantageously, embodiments disclosed herein may allow the user to query a corpus containing text transcripts of other customer support interactions. One or more results containing a solution (or resolution) to the technical problem may be identified in the corpus, e.g., to reconfigure a customer device's network settings. The solution may be automatically highlighted and presented to the customer support agent, who may then assist the customer with the reconfiguration.

Conventional solutions may involve manual and ad-hoc analysis to identify different zones of interest. For example, a user may have to listen to audio call logs and/or read text transcripts for thousands or more calls to identify a solution to a given problem. Furthermore, embodiments disclosed herein may return more accurate results from an unstructured corpus of text that includes unbounded discussion. For example, there is no known boundary or pattern for identifying text that includes a customer's reason for calling a support agent. Doing so may allow for more accurate identification of these call reasons (or other zones of interest), which may in turn identify other problems such as system outages, process errors, and the like. Further still, embodiments disclosed herein allow users to easily capture specific discussion points that otherwise lack clearly defined structure.

With general reference to notations and nomenclature used herein, the detailed descriptions herein may be presented in terms of program procedures executed on a computer or network of computers. These procedural descriptions and representations are used by those skilled in the art to effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose or it may comprise a computer as selectively activated or reconfigured by a computer program stored in the computer. The procedures presented herein are not inherently related to a particular computer or other apparatus. Various machines may be used with programs written in accordance with the teachings herein, or it may prove convenient to construct more specialized apparatus to perform the required method steps. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. However, the novel embodiments can be practiced without these specific details. In other instances, structures and devices are shown in block diagram form in order to facilitate a description thereof. The intention is to cover all modifications, equivalents, and alternatives consistent with the claimed subject matter.

In the Figures and the accompanying description, the designations "a" and "b" and "c" (and similar designators) are intended to be variables representing any positive integer. Thus, for example, if an implementation sets a value for a=5, then a complete set of components 123 illustrated as components 123-*a* through 123-*a* (or 123*a*) may include components 123-1, 123-2, 123-3, 123-4, and 123-5. The embodiments are not limited in this context.

FIG. 1 depicts a schematic of an exemplary system 100, consistent with disclosed embodiments. As shown, the system 100 includes at least one computing system 102. The computing system 102 comprises at least a processor 104 a memory 106. As shown, the memory 106 includes a search application 108 and a corpus 110. The computing system 102 is representative of any type of computing system or device, such as a server, compute cluster, cloud computing environment, virtualized computing system, and the like. The search application 108 is representative of any type of database management system (DBMS), search platform, search engine, or other application for receiving a query as input and returning one or more results from the corpus 110 as responsive to the query.

The corpus 110 is a corpus of a plurality of text transcripts 112 of communications (e.g., phone calls, online text-based chat sessions, etc.) between one or more customer service agents and one or more users in a communication session (also referred to as a customer support session). The text transcripts 112 may generally include all communications exchanged during the communication session. If the original conversation is audio-based, the text transcript 112 for the conversation may be generated based on a speech-to-text algorithm, or any other technique for generating text based on speech. Each text transcript 112 may further include notes or other text added by the agent during and/or after the support session. Therefore, because different parties are involved, the text transcripts 112 may vary in terminology used, the use of punctuation, grammatical structure, and the like. Stated differently, the text of the text transcripts 112 may be unstructured. For example, customers A and B may speak with agents Y and Z, respectively, regarding a credit increase. However, customer A may use the term "credit increase" while customer B may use the term "credit lift." Therefore, a search query processed by conventional search platforms may not return both results (e.g., if the query specifies "credit lift", the text transcript 112 associated customer A may not be returned, as "credit lift" may not match "credit increase".). Furthermore, a search platform that is configured to identify "credit increase" as a reason for the customer's call may not be able to identify the "credit lift" as the reason for customer B's call. Advantageously, however, the search application 108 may return more accurate results as described in greater detail herein.

As shown, the search application 108 includes a sentiment model 114, a clustering model 116, a classification model 118, and one or more heuristics 120. The heuristics 120 include a plurality of heuristics, or rules, for identifying zones of interest in the text transcripts 112. The zones of interest may be any statement attribute, including statement types. Example statement types for zones of interest may include a "call reason" type, an "agent resolution" type, a "personal story" type, or "negative statement" types. The call reason may generally reflect a reason a customer contacted customer service for a support session (e.g., technical issues, questions, requests, etc.). The agent resolution may generally reflect a resolution for a communication session, such as resetting a password, reconfiguring software, providing an extension of time to make a payment, and the like. The personal story may generally reflect statements where the customer talks about the impact of a product, service, and/or process on their personal life (e.g., an online payment tool made it easier for a customer to make payments). Negative statements may generally reflect statements that include negative sentiment (e.g., frustration when an online service is not available). Heuristics 120 for any other type of attribute may be defined, and the use of a particular zone of interest is by way of example and not limitation.

Additional heuristics 120 may specify to use regular expression (regex) patterns applied to the text transcripts 112 to identify relevant information near text in the text transcripts 112 that match these patterns. For example, a call reason regex pattern may specify to match "how can I help you" or any similar string. The call reason regex pattern may therefore match similar phrases in the text transcripts 112. Because a customer typically provides the reason for their call in response to these questions, the call reason may be identified within some distance of the matching text (e.g., one or more subsequent sentences, one or more paragraphs, etc.). Similarly, an agent resolution regex pattern may search for "thank you, it worked", or any similar statement, which may indicate that the customer's problem was resolved. Therefore, if text matching this pattern is found in the text transcripts 112, the agent resolution may be discovered in one or more preceding sentences and/or paragraphs.

The clustering model 116, classification model 118, and sentiment model 114 may be any type of computing model, such as a machine learning model, neural network, classifiers, clustering models, and the like. The sentiment model 114 is a natural language processing model that is configured to detect sentiment in the text of the text transcripts 112. For example, by processing a text transcript 112, the sentiment model 114 may detect "frustration" as a sentiment expressed by the user. In some embodiments, the sentiment model 114 may compute a sentiment score for a given text transcript, where the sentiment score reflects whether the text transcript 112 includes positive and/or negative sentiment. For example, a higher sentiment score may indicate greater negative sentiment than a lower sentiment score.

The clustering model 116 may be an embedding model that is trained on a training dataset of text transcripts (not pictured) to identify different variants of terms present in the training dataset. An embedding model may generally generate a numerical representation of each of a plurality of different words, phrases, and/or sentences. One example of the clustering model 116 is the sent2vec model trained using a dbscan clustering algorithm. The clustering model 116 may further be trained to identify specific zones of interest within proximity of any identified terms in a text transcript 112. For example, the trained clustering model 116 may identify "hurricane" and "twister" as variants of the term "storm" by clustering the term "storm". In some embodiments, one or more regex patterns may identify the term "storm" in a text transcript 112 for clustering by the clustering model 116. Therefore, in some embodiments, the trained clustering model 116 may identify a zone of interest associated with the terms "hurricane," "twister," or "storm" when these terms are identified in a given text transcript 112 (e.g., a call reason may be that the customer was affected by a hurricane). In some embodiments, the heuristics 120 may specify to apply the clustering model 116 to identify a call reason and/or an agent resolution. However, in some embodiments, the heuristics 120 may specify to apply the clustering model 116 to identify any type of zone of interest.

The classification model 118 is a classification model that may classify text into one or more topic clusters. The text classified by the classification model 118 may include text of the text transcripts 112 and/or one or more terms identified in the text transcripts 112 (e.g., based on seed word lists, regex matches, etc.). The topic clusters may be generated during an unsupervised training of the classification model 118, e.g., using an unsupervised training algorithm. In some embodiments, the topic clusters generated during the unsupervised training of the classification model 118 may be manually validated. In at least one embodiment, the classification model 118 is trained based on an initial seed list of words that is expanded using an embedding model trained on a training dataset of text transcripts. Doing so may produce an expanded word list that includes terms similar to the terms in the seed list. In one embodiment, the classification model 118 is trained based on the word2vec model. Using the expanded word list, the classification model 118 may identify words in the text transcripts 112 that belong to a given cluster and tag these statements as containing a zone of interest. In some embodiments, the classification model 118 classifies statements in the text transcripts 112 as belonging to a particular zone of interest if the total count of these statements in a given text transcript 112 exceeds a predetermined threshold count. In some embodiments, the classification model 118 includes a logistic regression model to classify statements into relevant zones of interest. For example, during training, terms related to a particular zone of interest may be masked (e.g., deleted, obfuscated, etc.) to eliminate bias during training, thereby training the classification model 118 to capture zones of interest based on the context of the statements they appear. For example, the term "family" may be masked to allow the classification model 118 to identify personal stories based on the context of a sentence that includes the term "family."

In some embodiments, the search application 108 may apply additional heuristics 120 to specific text segments (e.g., sentences, phrases, etc.) in the text transcripts 112 to identify zones of interest. For example, not all statements in a text transcript 112 are equally important. Some statements may have relevant information related to the call reason, while others do not. Therefore, the heuristics 120 may include a statement length heuristic 120 that filters statements based on the length of a statement relative to other statements (e.g., filter statements based on a threshold statement length), a length of the text transcript 112 (e.g., do not consider text transcripts 112 that do not exceed a threshold transcript length) whether one or more key phrases are present in a statement, whether the statement was made by an agent or a customer, and whether the statement includes one or more terms reflecting negative sentiment. Other heuristics 120 may include predetermined words and/or phrases that must be present in a text transcript 112 to determine a specific zone of interest (e.g., "thank you it worked" for an agent resolution, "it is very frustrating" for negative sentiment, and the like).

As another example, a position heuristic 120 may specify that a statement such as "how can I help you" must be present in the first N statements of the text transcript 112, where N is a predetermined threshold number of statements (or words, paragraphs, phrases, etc.) such as 10, 20, etc. In such an example, if the statement "how can I help you" is the $1000^{th}$ statement of 1500 statements in the text transcript 112 and the threshold is 10 statements, the position heuristic 120 may prevent the search application 108 from identifying a call reason statement based on the statement "how can I help you" in the $1000^{th}$ statement of the text transcript 112. If, however, the statement "how can I help you" is the second statement of the text transcript 112, the search application 108 may identify the call reason in one more subsequent statements.

Therefore, the search application 108 may use the trained sentiment model 114, clustering model 116, and/or classification model 118 to identify one or more zones of interest in the text transcripts 112. For example, a user may enter a search query into the search application 108 and receive a plurality of results that match the terms of the query. When the user selects a text transcript 112 from the results, the zone of interest (e.g., a call reason, negative sentiment, personal story, agent resolution, etc.) may be highlighted and displayed in a graphical user interface (GUI). Embodiments are not limited in this context.

As another example, the user may provide input specifying one or more zones of interest (e.g., a call reason, negative sentiment, personal story, agent resolution, etc.), and receive a list of results that specify the requested zones of interest for each text transcript 112 in the results. For example, the search application 108 may determine the heuristics 120 for identifying the agent resolution in a text transcript 112. The heuristics 120 may include applying one or more regex patters to the text of the text transcript 112 to identify relevant words and/or phrases. The heuristics 120 may further include applying the sentiment model 114 to the text transcript 112 to identify sentiment therein. The clustering model 116 may then cluster the identified words, phrases, and/or sentiment to generate an expanded set of words, phrases, and or sentiment terms. The classification model 118 may then classify the expanded set of words, phrases, and or sentiment terms, and tag each word, phrase, and/or term that is classified as belonging to a zone of interest. Embodiments are not limited in this context.

Figure 2A:
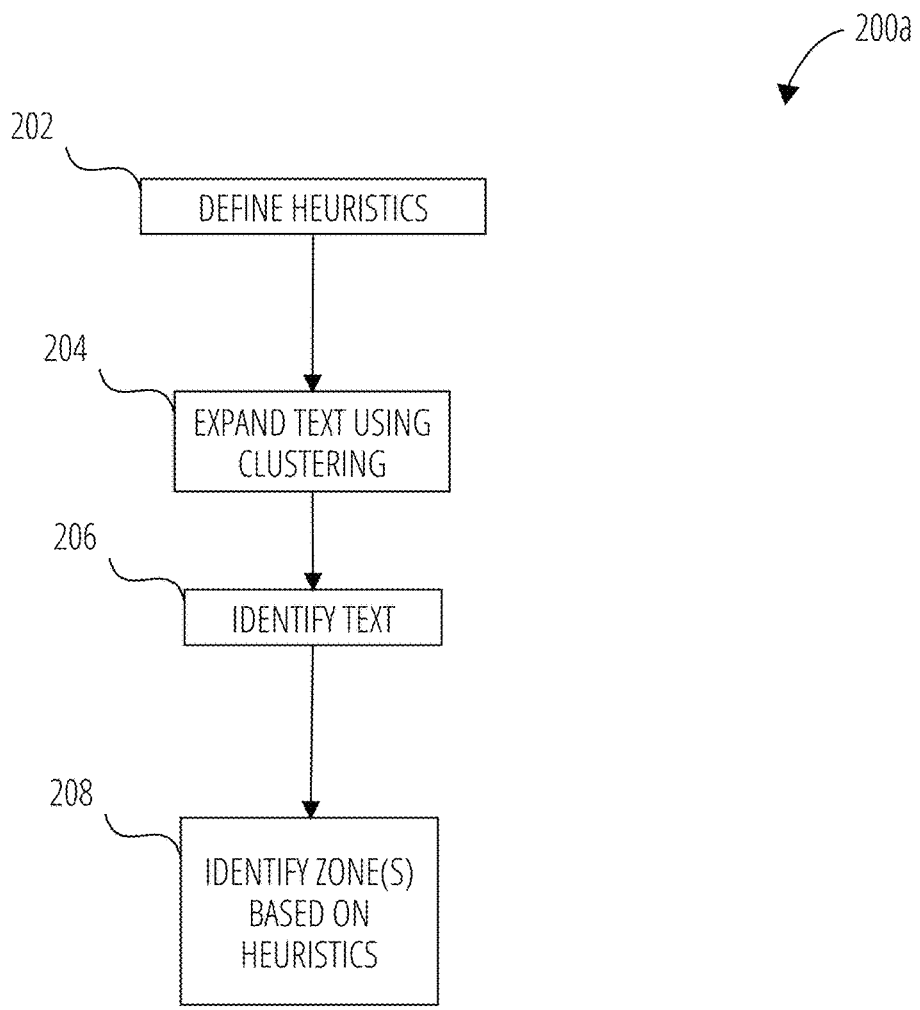
FIG. 2A illustrates an aspect of the subject matter in accordance with one embodiment.

FIG. 2A is a schematic illustrating a process flow 200a for identifying one or more zones of interest in the text transcripts 112, according to various embodiments. Generally, the process flow 200a leverages heuristics 120 and natural language processing techniques to allow the search application 108 to identify zones of interest in unbounded discussions in the text transcripts 112. In block 202, one or more heuristics 120 and/or statements of interest may be defined based on the text transcripts 112. Generally, at block 202, the text structure of the text transcripts 112 may be leveraged to identify areas within a given text transcript 112 that have a high probability of including the desired zone of interest. Doing so may allow statements to be defined as well as regex patterns for identifying these statements. For example, the phrase "how can I help you" may be defined as having a high probability of being associated with (e.g., within a predetermined distance in the text transcript 112) of a call reason. Therefore, a regex pattern may be defined to match the phrase "how can I help you?" or similar variants thereof. Such a regex pattern may be useful to identify the call reason (e.g., within a predefined distance of the identified phrase). As another example, a regex pattern may be defined to match the phrase "try this" or similar variants thereof to identify an agent resolution (e.g., within a predefined distance of the identified phrase). More generally, at block 202, one or more statements associated with a specific zone of interest may be defined.

Furthermore, the heuristics 120 may leverage other characteristics of the text transcripts 112, such as phrase length (e.g., define a heuristic 120 to identify phrases exceeding a threshold character and/or phrase length), the position of phrases in the text transcripts 112 (e.g., define a heuristic 120 to identify phrases within a predefined distance of a target phrase), the type of phrases (e.g., define a heuristic 120 to identify specific statement types based on the presence of concepts in a phrase), etc.

In block 204, statement clustering may be used to identify statements similar to the statements defined at block 202. For example, the clustering model 116 may cluster each statement defined at block 202 into one or more clusters. The clusters may include other phrases that are similar to the statement being processed. For example, by clustering the statement "how can I help you?" the clustering model 116 may identify the statement "how may I help you?" in the cluster and associate the statement (and other statements in the cluster) with call reasons. One or more regex patterns may then be defined to match these identified statements. More generally, the clustering model 116 generates an exhaustive list for statements of a particular type at block 204. Doing so allows different variants of a statement to be identified regardless of the statement type and/or particular zone of interest. As another example, the phrase "it worked!" may be defined in block 202 as being associated with an agent resolution zone of interest. Therefore, the clustering model 116 may cluster the statement to identify "it's fixed" as a related statement. The clustering model 116 may store associations between the statements and other statements in the cluster to which it is clustered.

In block 206, the search application 108 may identify text in the text transcripts 112 that match the statements identified at blocks 202 and 204. For example, the search application 108 may query the text transcripts 112 using the statement "it worked," which may return one or more text transcripts 112 that match or otherwise include the statement. Furthermore, the query may be supplemented by the terms generated by the clustering model 116 at block 204. For example, the search application 108 may further query the text transcripts 112 using the phrase "it's fixed" and any other associated statement identified by the clustering model 116. Doing so allows the search application 108 to perform an exhaustive search for varying statements that include the same or similar concepts.

At block 208, the search application 108 may identify zones of interest based at least in part on heuristics 120. For example, the classification model 118 may classify the text transcript 112 and/or the identified statement (e.g., a portion of the text transcript 112 that includes the phrase "it worked"). Doing so may allow the classification model 118 to classify (e.g., tag) the statement as belonging to a zone of interest, such as the agent resolution zone of interest. Similarly, the sentiment model 114 may process the text of a given text transcript 112 to identify statements reflecting positive and/or negative sentiment as the zones of interest. In some embodiments, the statements reflecting positive and/or negative sentiment are filtered based on a predetermined filtering threshold. For example, a positive and/or negative sentiment statement may be identified if a number of instances of positive and/or negative sentiment in the text transcript 112 exceed the filtering threshold. In some embodiments, the sentiment model 114 may compute a sentiment score based on the number of statements reflecting negative sentiment and the number of statements reflecting positive sentiment in a given text transcript 112.

Once a zone of interest is identified, the search application 108 may generate a graphical indication of the zone of interest, e.g., an icon, callout box, or any other graphical indicator, and associate the indication with the text of the text transcript 112 that includes the zone of interest (e.g., by placing the graphical indicator proximate to the text of the text transcript 112 that was tagged as including the zone of interest). Furthermore, the search application 108 may apply other effects to the text of the text transcript 112 that includes the zone of interest, such as applying bold font, italics font, highlighting the text, etc.

Figure 2B:
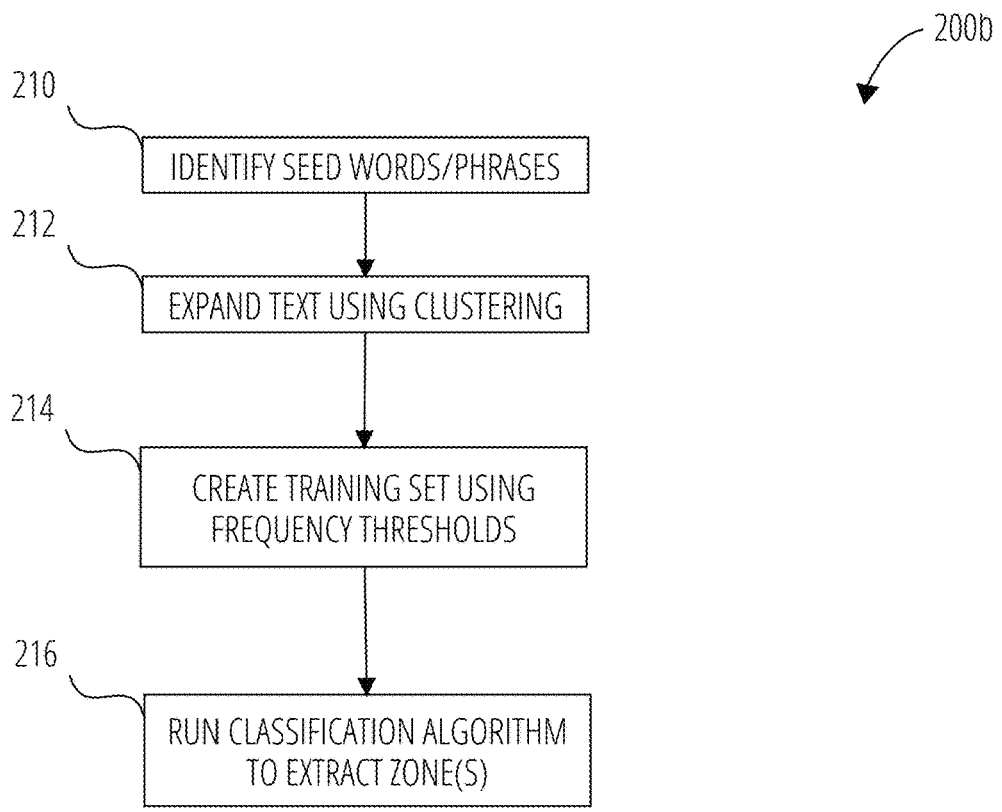
FIG. 2B illustrates an aspect of the subject matter in accordance with one embodiment.

FIG. 2B is a schematic illustrating a process flow 200b for leveraging conversation characteristics to capture specific statements that include one or more zones of interest. In some embodiments, one or more of the steps of the process flow 200b may be in addition to one or more of the steps of the process flow 200a. In other embodiments, the process flows 200a, 200b, are separate process flows.

In block 210, seed words and/or phrases may be identified for each zone of interest based on one or more heuristics 120. Generally, the seed words and/or phrases describe the discussion in the text transcripts 112. For example, for the personal stories zone of interest, the seed words and/or phrases may include words related to occupations, family, and/or health, as these topics are commonly included in discussions related to personal situations. As another example, for negative sentiment, a list of words and/or phrases that reflect negative sentiment may be used (e.g., "frustrated," "angry," horrible", etc.).

In block 212, the clustering model 116 may expand the seed words and/or phrases determined at block 210 using clustering to produce an expanded set of words and/or phrases. Generally, the clustering model 116 may use a clustering algorithm to cluster each term and/or phrase in the seed list. The cluster may include terms related to the seed terms, such as identifying the terms "father" and "mother" in a cluster generated by clustering the term "family". Doing so ensures that all words and/or phrases related to a seed word and/or phrase are covered. More generally, the clustering model 116 generates an exhaustive list for words and/or phrases in the seed list. Doing so allows queries to be expanded to ensure proper coverage of terms in the corpus 110 even though different users may use different terms in the text transcripts 112. Furthermore, one or more regex patterns may be defined based on the expanded set of words and/or phrases.

At block 214, a training dataset is generated using frequency thresholds to train the classification model 118. The training dataset may include historical text transcripts. Generally, the frequency thresholds may be predetermined term thresholds. For example, statements appearing more than a threshold number of times in a text transcript 112 may be classified as a true positive. These words may then be masked to eliminate bias in the training dataset. For example, if the threshold is 10 instances, and the term "family" appears 12 times in a text transcript 112, the term "family" may be labeled as a true positive and the term "family" may be masked (e.g., deleted, obfuscated, etc.) from the training dataset. Conversely, a term appearing less than the threshold number of times may not be relevant in training the classification model 118. Doing so may standardize the process of creating a training dataset for the classification model 118. Furthermore, during runtime operations, the trained classification model 118 may filter results that do not include a threshold number of instances of the term.

At block 216, a classification algorithm is used to train the classification model 118. The training generally causes the classification model 118 to extract one or more zones of interest. For example, by training the classification model 118 on the training dataset, the classification model 118 may identify additional statements that capture intent but do not contain terms that are present in the expanded set of words and/or phrases. For example, based on the training dataset, the classification model 118 may extract the term "next of kin" as being related to the term "family", even though the term "next of kin" is not present in the expanded set of words and/or phrases generated at block 212. Doing so produces a more complete set of terms and/or phrases that may be used to identify zones of interest. For example, the search application 108 may query the text transcripts 112 using the statement "family," which may return one or more text transcripts 112 that include the statement "family". Furthermore, the query may be supplemented by the terms generated at blocks 210 through 216. For example, the search application 108 may further query the text transcripts 112 using the phrase "next of kin" and any other associated statement identified by the clustering model 116 and/or the classification model 118. Doing so allows the search application 108 to perform an exhaustive search for varying statements that include the same or similar concepts.

One or more zones of interest may then be identified. For example, the search application 108 may apply one or more heuristics 120 to identify text in the text transcripts 112 (e.g., identify the call reason by identifying the text following the phrase "how can I help you" in the text transcript 112). Similarly, the sentiment model 114 may process the text of a given text transcript 112 to identify statements reflecting positive and/or negative sentiment as the zones of interest. Further still, the trained classification model 118 may process some or all of the text transcripts 112 to identify the zone of interest, such as the call reason, agent resolution, statements reflecting sentiment, or personal statements, and tag each statement including a zone of interest. In some embodiments, the identified statements may be filtered based on a predetermined filtering threshold. For example, a personal story statement may be identified if a number of instances of terms associated with personal stories identified in the text transcript 112 exceed the filtering threshold.

Once a given zone of interest is identified, the search application 108 may generate a graphical indication of the zone of interest and associate the graphical indication with the associated text in the text transcript 112 in a GUI.

Figure 3:
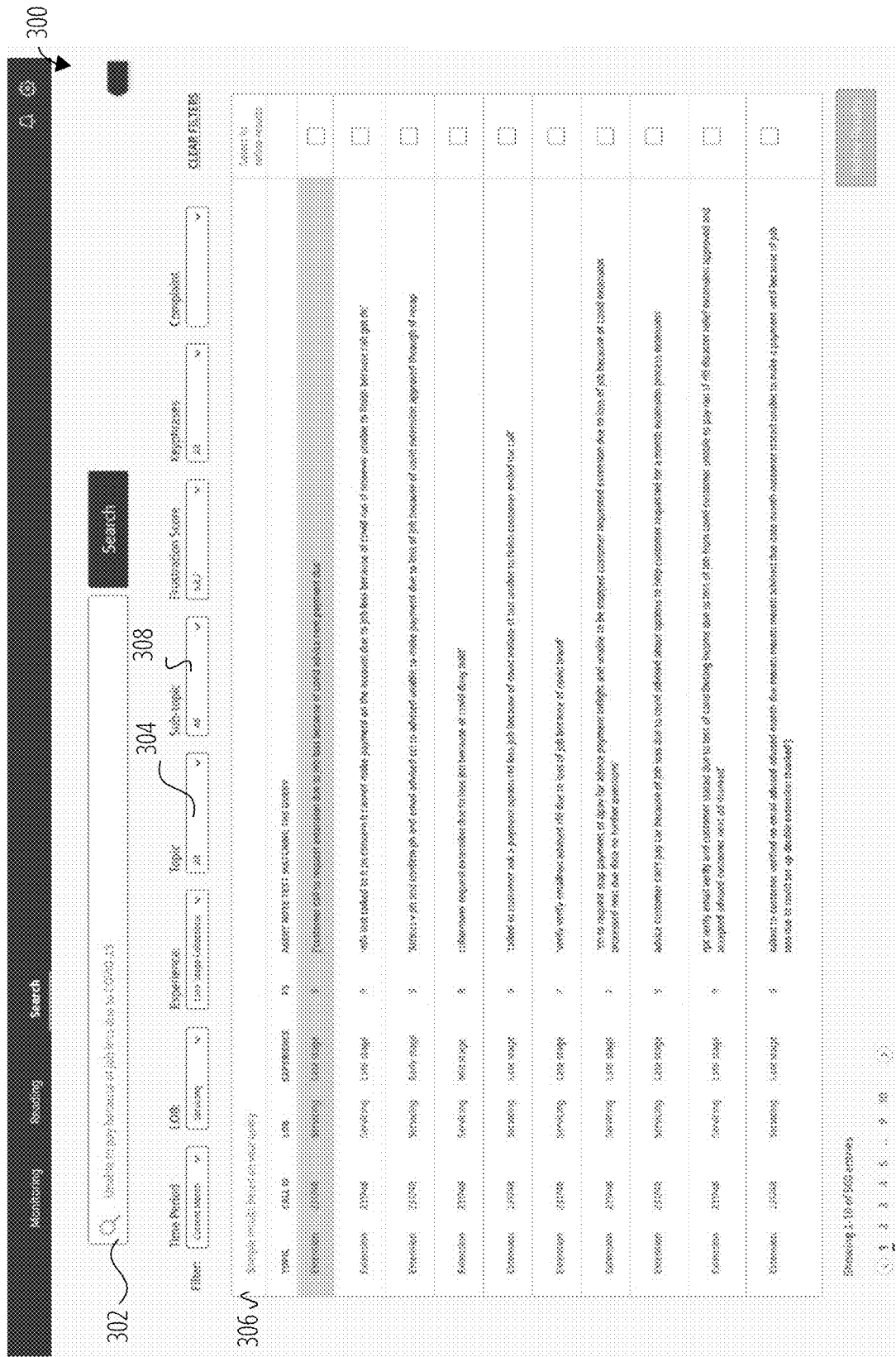
FIG. 3 illustrates an aspect of the subject matter in accordance with one embodiment.

FIG. 3 is a schematic illustrating a GUI 300 of the search application 108, according to various embodiments. As shown, the GUI 300 includes a search interface 302 which allows a user to submit a query. As shown, the query generally specifies to search for customers affected by the COVID-19 pandemic. Advantageously, the search application 108 may process the query to return a set of results 306 that reflects customers that were affected by the COVID-19 pandemic.

In some embodiments, the clustering model 116 and/or the classification model 118 may process the query to identify one or more topics in the query. Doing so allows the search application 108 to generate one or more topic filters 304 that allows users to filter search results based on the identified topics. The topic filters 304 may include a list of selectable topics. Furthermore, the classification model 118 may process the query to cluster the query into one or more topic clusters. By doing so, the classification model 118 may identify one or more subtopics that are related to one or more topics in the query.

The search application 108 may then generate a sub-topic filter 308 that allows users to filter search results based on the identified subtopics. The search application 108 may process the query against the corpus 110 to return one or more results matching one or more terms of the query. Furthermore, the search application 108 may supplement the query with one or more topics generated by the clustering model 116 and one or more subtopics generated by the classification model 118. Doing so may return an initial result set including one or more text transcripts 112. By adding the topics and subtopics to the query, the search application 108 may return a greater number of results in the initial result set relative to processing the query without the topics and/or subtopics.

Figure 4:
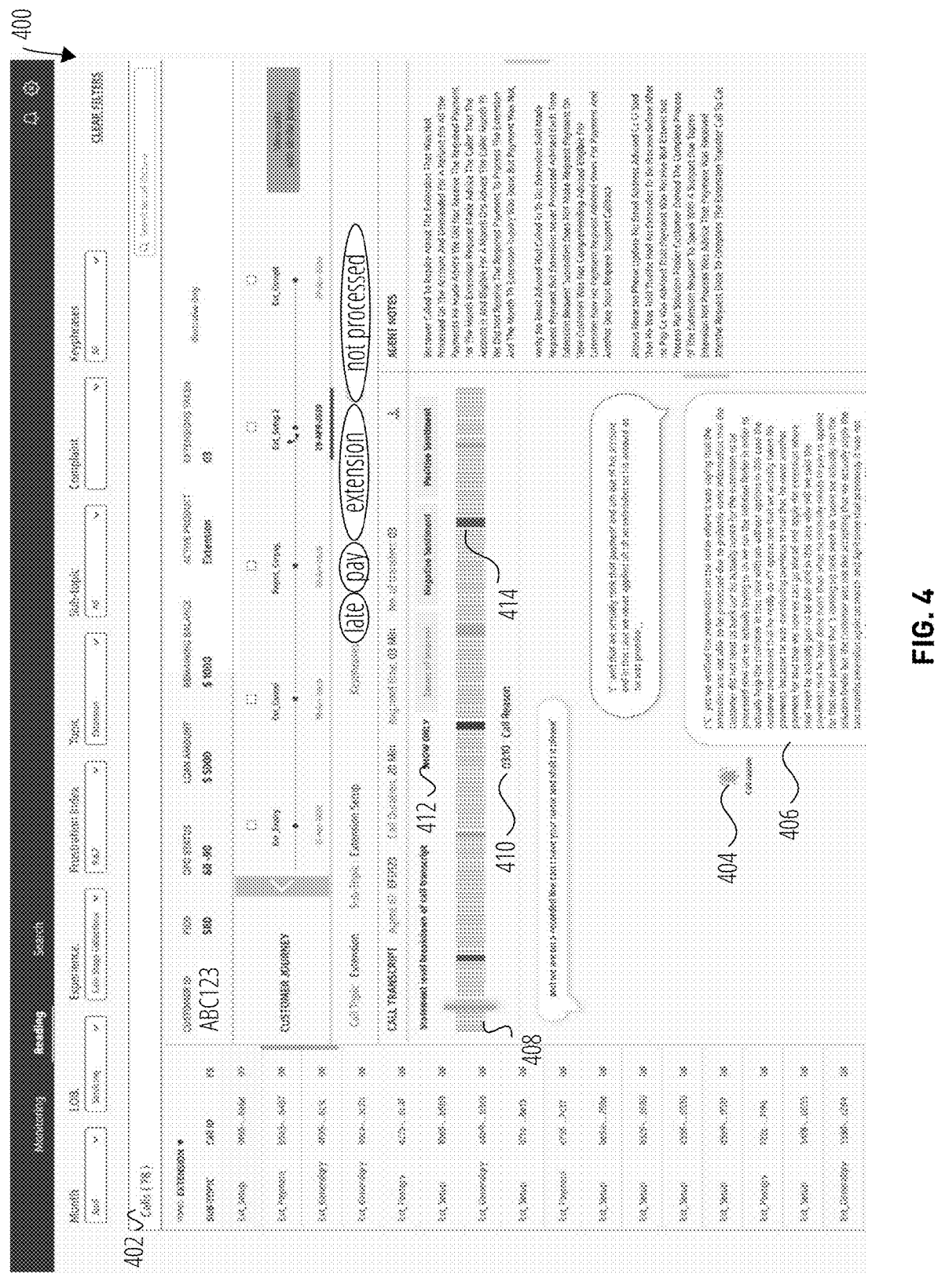

FIG. 4 is a schematic illustrating a GUI 400 of the search application 108, according to various embodiments. As shown, a plurality of text transcripts 112 may be displayed in the GUI 400. Details of a selected text transcript 112 may include a call reason indicator 404 generated by the search application 108. The call reason indicator 404 may be associated with a text segment 406 that reflects a specific zone of interest, namely the "call reason" zone of interest. Stated differently, the text segment 406 may include the reason the customer initiated the communication session associated with the selected text transcript 112. The call reason may be determined by the search application 108 using the natural language processing and deep learning techniques described herein. The search application 108 may apply other effects to the text segment 406, such as applying bold font to the text segment 406, italics font to the text segment 406, highlighting the text segment 406, etc. Furthermore, other identified zones of interest may be similarly highlighted and displayed in the GUI 400.

The call reason may further be highlighted in a timeline 408 of the call at timeline position 410. The timeline 408 may include each identified zone of interest in the text transcript 112. Advantageously, filters 412 allow the user to select specific zones of interest, which causes statements from the text transcript 112, such as the statement in the text segment 406, to be displayed in the GUI 400. As another example, timeline position 414 may be associated with negative sentiment detected in the text transcript 112 based on the sentiment model 114 processing the text transcript 112. If the user selects timeline position 414, the associated portion of the text transcript 112 that includes negative sentiment may be displayed in the GUI 400 similar to the text segment 406 with corresponding indicator 404.

Figure 5:
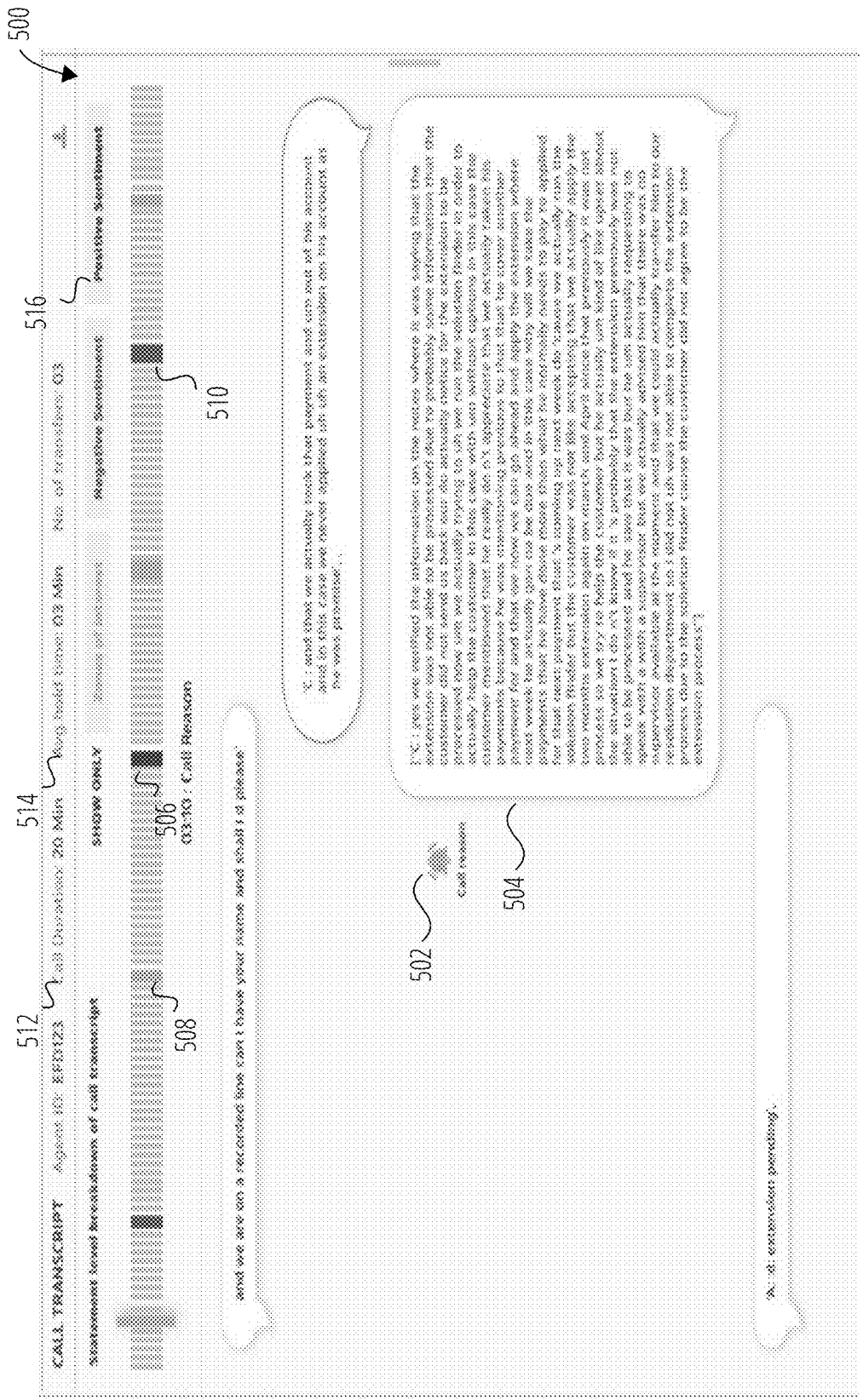
FIG. 5 illustrates an aspect of the subject matter in accordance with one embodiment.

FIG. 5 is a schematic illustrating a GUI 500 of the search application 108, according to various embodiments. As shown, the GUI 500 includes a more detailed view of one or more statements in a selected text transcript 112. For example, the GUI 500 reflects a call duration 512 and the amount of hold time 514 the customer spent waiting on hold. Furthermore, the GUI 500 includes a highlight 502, which may be any type of graphical indicator, that is associated with a call reason segment 504 from the text transcript 112. The call reason 504 may be displayed based on selection of the timeline element 506. Other statements may be displayed based on selection of other timeline elements, such as elements 508 and 510. The elements 508, 510, may be associated with specific zones of interest, such as statements of negative sentiment, statements of positive sentiment, agent resolutions, personal stories, and/or the call reason. The zones of interest may be determined by the search application 108 as described herein. For example, the statements of negative sentiment and positive sentiment may be identified by the sentiment model 114 based on processing the text of the text transcript 112. The call reason and/or agent resolution may be determined based on one or more regex patters to identify relevant terms. The classification model 118 may then classify one of the identified relevant terms in the text transcript 112. Personal stories may be determined regex patterns applied to the text, which returns one or more relevant terms that are processed using the clustering model 116. Embodiments are not limited in this context.

Operations for the disclosed embodiments may be further described with reference to the following figures. Some of the figures may include a logic flow. Although such figures presented herein may include a particular logic flow, it can be appreciated that the logic flow merely provides an example of how the general functionality as described herein can be implemented. Further, a given logic flow does not necessarily have to be executed in the order presented unless otherwise indicated. Moreover, not all acts illustrated in a logic flow may be required in some embodiments. In addition, the given logic flow may be implemented by a hardware element, a software element executed by a processor, or any combination thereof. The embodiments are not limited in this context.

Figure 6:
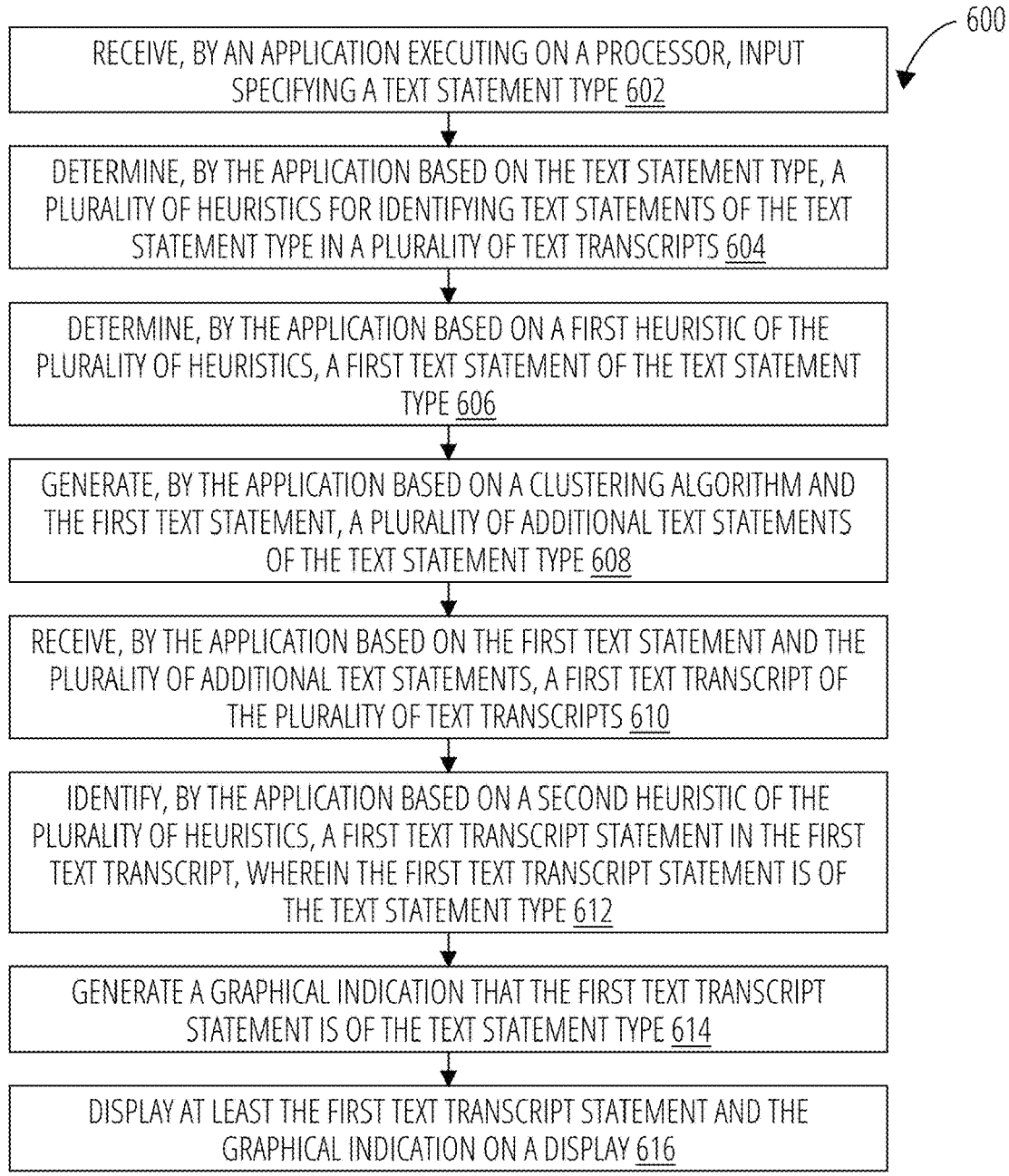
FIG. 6 illustrates a routine 600 in accordance with one embodiment.

FIG. 6 illustrates an embodiment of a logic flow, or routine, 600. The logic flow 600 may be representative of some or all of the operations executed by one or more embodiments described herein. For example, the logic flow 600 may include some or all of the operations for processing text transcripts 112 to identify one or more zones of interest. Embodiments are not limited in this context.

In block 602, routine 600 receives, by the search application 108 executing on a processor, input specifying a text statement type. For example, a customer service agent may specify to search for statements including negative sentiment. As another example, the customer service agent may specify to search for call reasons, agent resolutions, and/or personal stories. In block 604, routine 600 determines, by the search application 108 based on the text statement type, a plurality of heuristics for identifying text statements of the text statement type in a plurality of text transcripts 112. For example, the search application 108 may determine heuristics 120 for identifying statements of negative sentiment.

In block 606, routine 600 determines, by the application based on a first heuristic of the plurality of heuristics, a first text statement of the text statement type. In block 608, routine 600 generates, by the application based on a clustering algorithm and the first text statement, a plurality of additional text statements of the text statement type. In block 610, routine 600 receives, by the application based on the first text statement and the plurality of additional text statements, a first text transcript 112 of the plurality of text transcripts 112. In block 612, routine 600 identifies, by the application based on a second heuristic of the plurality of heuristics, a first text transcript statement in the first text transcript 112, wherein the first text transcript statement is of the text statement type. In block 614, routine 600 generates a graphical indication that the first text transcript statement is of the text statement type. In block 616, routine 600 displays at least the first text transcript statement and the graphical indication on a display.

Figure 7:
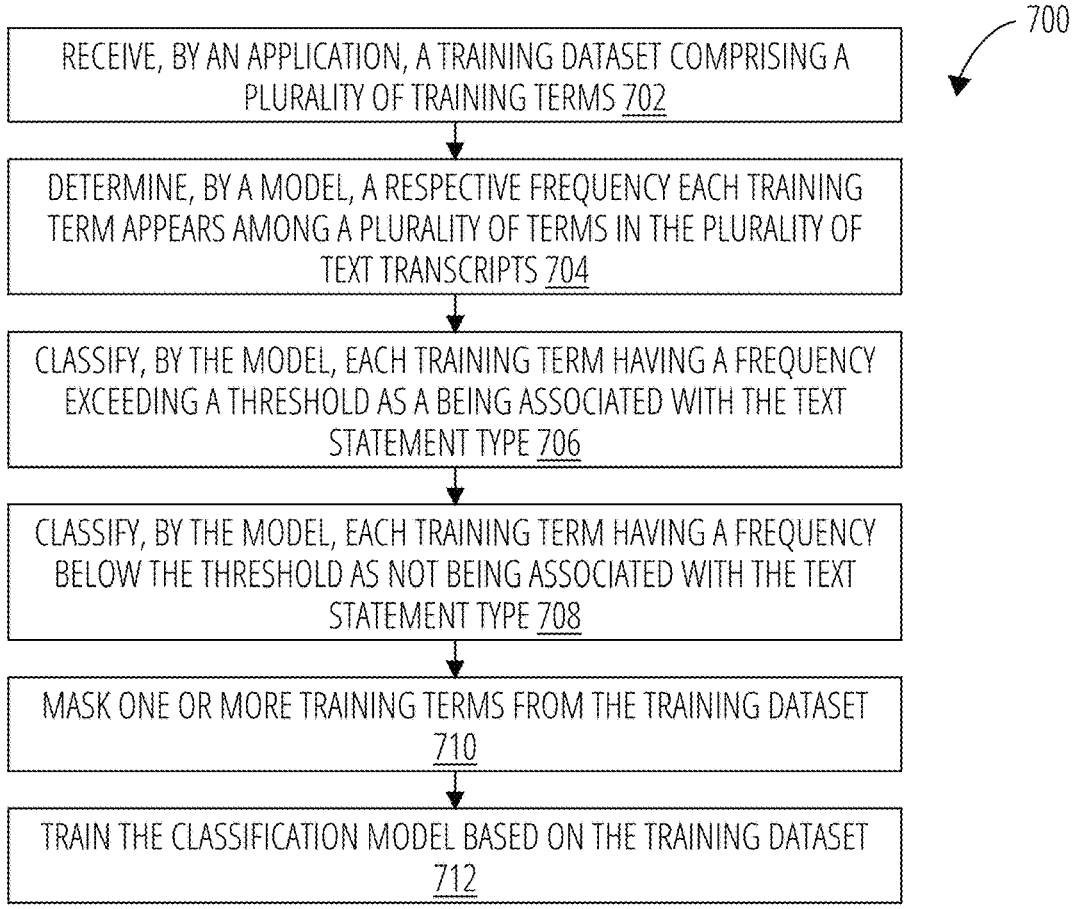
FIG. 7 illustrates a routine 700 in accordance with one embodiment.

FIG. 7 illustrates an embodiment of a logic flow, or routine, 700. The logic flow 700 may be representative of some or all of the operations executed by one or more embodiments described herein. For example, the logic flow 700 may include some or all of the operations for training the classification model 118. Embodiments are not limited in this context.

In block 702, routine 700 receives, by the search application 108, a training dataset comprising a plurality of training terms. The terms may be included in one or more text transcripts 112 of a training dataset. In block 704, routine 700 determines, by the classification model 118, a respective frequency each training term appears among a plurality of terms in the plurality of text transcripts. In block 706, routine 700 classifies, by the classification model 118, each training term having a frequency exceeding a threshold as a being associated with the text statement type. In block 708, routine 700 classifies, by the classification model 118, each training term having a frequency below the threshold as not being associated with the text statement type. In block 710, routine 700 masks one or more training terms from the training dataset. In block 712, routine 700 trains the classification model 118 based on the training dataset.

Figure 8:
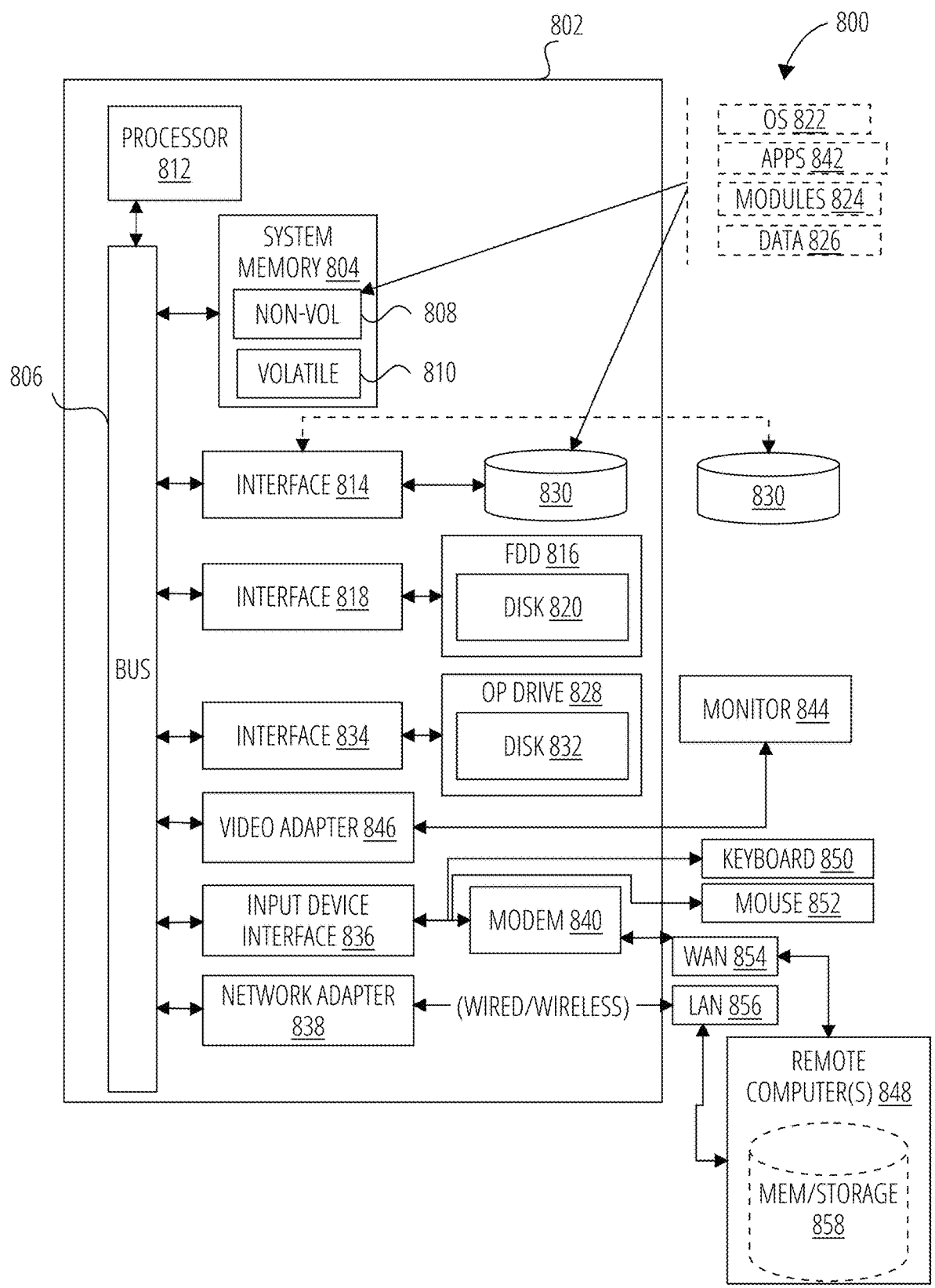
FIG. 8 illustrates a computer architecture 800 in accordance with one embodiment.

FIG. 8 illustrates an embodiment of an exemplary computer architecture 800 including a computer 802 suitable for implementing various embodiments as previously described. In various embodiments, the computer architecture 800 may include or be implemented as part of system the computing system 102.

As used in this application, the terms "system" and "component" are intended to refer to a computer-related entity, either hardware, a combination of hardware and software, software, or software in execution, examples of which are provided by the exemplary computing computer architecture 800. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computer architecture 800 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computer architecture 800.

As shown in FIG. 8, the computer 802 includes a processor 812, a system memory 804 and a system bus 806. The processor 812 can be any of various commercially available processors.

The system bus 806 provides an interface for system components including, but not limited to, the system memory 804 to the processor 812. The system bus 806 can be any of several types of bus structure that may further interconnect to a memory bus (with or without a memory controller), a peripheral bus, and a local bus using any of a variety of commercially available bus architectures. Interface adapters may connect to the system bus 806 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computer architecture 800 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 804 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 8, the system memory 804 can include non-volatile 808 and/or volatile 810. A basic input/output system (BIOS) can be stored in the non-volatile 808.

The computer 802 may include various types of computer-readable storage media in the form of one or more lower speed memory units, including an internal (or external) hard disk drive 830, a magnetic disk drive 816 to read from or write to a removable magnetic disk 820, and an optical disk drive 828 to read from or write to a removable optical disk 832 (e.g., a CD-ROM or DVD). The hard disk drive 830, magnetic disk drive 816 and optical disk drive 828 can be connected to system bus 806 by an HDD interface 814, and FDD interface 818 and an optical disk drive interface 834, respectively. The HDD interface 814 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and non-volatile 808, and volatile 810, including an operating system 822, one or more applications 842, other program modules 824, and program data 826. In various embodiments, the one or more applications 842, other program modules 824, and program data 826 can include, for example, the various applications and/or components of the system 102.

A user can enter commands and information into the computer 802 through one or more wire/wireless input devices, for example, a keyboard 850 and a pointing device, such as a mouse 852. Other input devices may include microphones, infra-red (IR) remote controls, radio-frequency (RF) remote controls, game pads, stylus pens, card readers, dongles, fingerprint readers, gloves, graphics tablets, joysticks, keyboards, retina readers, touch screens (e.g., capacitive, resistive, etc.), trackballs, track pads, sensors, styluses, and the like. These and other input devices are often connected to the processor 812 through an input device interface 836 that is coupled to the system bus 806 but can be connected by other interfaces such as a parallel port, IEEE 1394 serial port, a game port, a USB port, an IR interface, and so forth.

A monitor 844 or other type of display device is also connected to the system bus 806 via an interface, such as a video adapter 846. The monitor 844 may be internal or external to the computer 802. In addition to the monitor 844, a computer typically includes other peripheral output devices, such as speakers, printers, and so forth.

The computer 802 may operate in a networked environment using logical connections via wire and/or wireless communications to one or more remote computers, such as a remote computer(s) 848. The remote computer(s) 848 can be a workstation, a server computer, a router, a personal computer, portable computer, microprocessor-based entertainment appliance, a peer device or other common network node, and typically includes many or all the elements described relative to the computer 802, although, for purposes of brevity, only a memory and/or storage device 858 is illustrated. The logical connections depicted include wire/wireless connectivity to a local area network 856 and/or larger networks, for example, a wide area network 854. Such LAN and WAN networking environments are commonplace in offices and companies, and facilitate enterprise-wide computer networks, such as intranets, all of which may connect to a global communications network, for example, the Internet.

When used in a local area network 856 networking environment, the computer 802 is connected to the local area network 856 through a wire and/or wireless communication network interface or network adapter 838. The network adapter 838 can facilitate wire and/or wireless communications to the local area network 856, which may also include a wireless access point disposed thereon for communicating with the wireless functionality of the network adapter 838.

When used in a wide area network 854 networking environment, the computer 802 can include a modem 840, or is connected to a communications server on the wide area network 854 or has other means for establishing communications over the wide area network 854, such as by way of the Internet. The modem 840, which can be internal or external and a wire and/or wireless device, connects to the system bus 806 via the input device interface 836. In a networked environment, program modules depicted relative to the computer 802, or portions thereof, can be stored in the remote memory and/or storage device 858. It will be appreciated that the network connections shown are exemplary and other means of establishing a communications link between the computers can be used.

The computer 802 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11 (a, b, g, n, etc.) to provide secure, reliable, fast wireless connectivity. A Wi-Fi network can be used to connect computers to each other, to the Internet, and to wire networks (which use IEEE 802.3-related media and functions).

The various elements of the devices as previously described with reference to FIGS. 1-8 may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It will be appreciated that the exemplary devices shown in the block diagrams described above may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

At least one computer-readable storage medium may include instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A method, comprising:
receiving, by an application executing on a processor, input specifying a text statement type;
determining, by the application based on the text statement type, a plurality of heuristics for identifying text statements of the text statement type in a plurality of text transcripts;
determining, by the application based on a first heuristic of the plurality of heuristics, a first text statement of the text statement type;
generating, by the application based on a clustering algorithm and the first text statement, a plurality of additional text statements of the text statement type;
assigning, by a classification model, a classification tag to each of the plurality of additional text statements, the classification tag indicating that each of the plurality of additional text statements is of the text statement type, wherein the classification model is trained based on a training dataset comprising a plurality of training terms, wherein one or more of the plurality of training terms is masked in the training dataset based on a respective frequency each training term appears among a plurality of terms in the plurality of text transcripts and whether the respective frequency exceeds a threshold;
receiving, by the application based on the first text statement and the plurality of additional text statements, a first text transcript of the plurality of text transcripts;
identifying, by the application based on a second heuristic of the plurality of heuristics, a first text transcript statement in the first text transcript, wherein the first text transcript statement is of the text statement type;
generating a graphical indication that the first text transcript statement is of the text statement type;
displaying at least the first text transcript statement and the graphical indication on a display;
the method further comprising:
determining, by the application based on a third heuristic of the plurality of heuristics, a plurality of seed words related to the text statement type; and
generating, by the application based on the clustering algorithm and the plurality of seed words, the plurality of additional text statements of the text statement type; and
the method further comprising, prior to receiving the input:
receiving, by the application, the training dataset comprising the plurality of training terms;
determining, by the application, the respective frequency each training term appears among the plurality of terms in the plurality of text transcripts;
classifying, by the application, a first subset of the plurality of training terms as being associated with the text statement type based on the respective frequencies of the first subset exceeding the threshold;
classifying, by the application, a second subset of the plurality of training terms as not being associated with the text statement type based on the respective frequencies of the second subset not exceeding the threshold; and
masking the first subset of the plurality of training terms from the training dataset.

2. The method of claim 1, wherein the first text transcript statement is further identified based on one or more of: (i) a length of the first text transcript statement, (ii) whether a predetermined phrase is present in the first text transcript statement, (iii) whether the first text transcript statement is associated with a customer or a customer support agent, (iv) a sentiment score computed for the first text transcript statement, and (v) whether a term of the first text transcript statement is associated with a negative sentiment.

3. The method of claim 1, wherein the text statement types comprise one or more of: (i) a reason a customer associated with the text transcript contacted a customer support agent, (ii) a call resolution associated with the customer support agent, (iii) a personal story associated with the customer, and (iv) a negative statement made by the customer.

4. The method of claim 1, wherein the first text transcript is identified based on one or more statements of the first text transcript matching the first text statement or at least one of the plurality of additional text statements, wherein the graphical indication comprises one or more of: (i) a symbol, (ii) a highlighting effect applied to the first text transcript statement, (iii) a bold effect applied to the first text transcript statement, or (iv) an italics effect applied to the first text transcript statement.

5. The method of claim 1, wherein the text statement type is defined as being separate from a statement in the plurality of text transcripts.

6. A non-transitory computer-readable storage medium, the computer-readable storage medium including instructions that when executed by a processor, cause the processor to:
receive, by an application, input specifying a text statement type;

determine, by the application based on the text statement type, a plurality of heuristics for identifying statements of the text statement type in a plurality of text transcripts;

determine, by the application based on a first heuristic of the plurality of heuristics, a first text statement of the text statement type;

generate, by the application based on a clustering algorithm and the first text statement, a plurality of additional text statements of the text statement type;

assign, by a classification model, a classification tag to each of the plurality of additional text statements, the classification tag indicating that each of the plurality of additional text statements is of the text statement type, wherein the classification model is trained based on a training dataset comprising a plurality of training terms, wherein one or more of the plurality of training terms is masked in the training dataset based on a respective frequency each training term appears among a plurality of terms in the plurality of text transcripts and whether the respective frequency exceeds a threshold;

receive, by the application based on the first text statement and the plurality of additional text statements, a first text transcript of the plurality of text transcripts;

identify, by the application based on a second heuristic of the plurality of heuristics, a first text transcript statement in the first text transcript, wherein the first text transcript statement is of the text statement type;

generate a graphical indication that the first text transcript statement is of the text statement type;

display at least the first text transcript statement and the graphical indication on a display;

the instructions further causing the processor to:
  determine, by the application based on a third heuristic of the plurality of heuristics, a plurality of seed words related to the text statement type; and
  generate, by the application based on the clustering algorithm and the plurality of seed words, the plurality of additional text statements of the text statement type; and the instructions further causing the processor to, prior to receiving the input:
  receive, by the application, the training dataset comprising the plurality of training terms;
  determine, by the application, the respective frequency each training term appears among a plurality of terms in the plurality of text transcripts;
  classify, by the application, a first subset of the plurality of training terms as being associated with the text statement type based on the respective frequencies of the first subset exceeding the threshold;
  classify, by the application, a second subset of the plurality of training terms as not being associated with the text statement type based on the respective frequencies of the second subset not exceeding the threshold; and
  mask the first subset of the plurality of training terms from the training dataset.

7. The computer-readable storage medium of claim 6, wherein the first text transcript statement is further identified based on one or more of: (i) a length of the first text transcript statement, (ii) whether a predetermined phrase is present in the first text transcript statement, (iii) whether the first text transcript statement is associated with a customer or a customer support agent, (iv) a sentiment score computed for the first text transcript statement, and (v) whether a term of the first text transcript statement is associated with a negative sentiment.

8. The computer-readable storage medium of claim 6, wherein the text statement types comprise one or more of: (i) a reason a customer associated with the text transcript contacted a customer support agent, (ii) a call resolution associated with the customer support agent, (iii) a personal story associated with the customer, and (iv) a negative statement made by the customer.

9. The computer-readable storage medium of claim 6, wherein the first text transcript is identified based on one or more statements of the first text transcript matching the first text statement or at least one of the plurality of additional text statements, wherein the graphical indication comprises one or more of: (i) a symbol, (ii) a highlighting effect applied to the first text transcript statement, (iii) a bold effect applied to the first text transcript statement, or (iv) an italics effect applied to the first text transcript statement.

10. The computer-readable storage medium of claim 6, wherein the text statement type is defined as being separate from a statement in the plurality of text transcripts.

11. A computing apparatus comprising:
a processor; and
a memory storing instructions that, when executed by the processor, cause the processor to:
receive, by an application, input specifying a text statement type;
determine, by the application based on the text statement type, a plurality of heuristics for identifying statements of the text statement type in a plurality of text transcripts;
determine, by the application based on a first heuristic of the plurality of heuristics, a first text statement of the text statement type;
generate, by the application based on a clustering algorithm and the first text statement, a plurality of additional text statements of the text statement type;
assign, by a classification model, a classification tag to each of the plurality of additional text statements, the classification tag indicating that each of the plurality of additional text statements is of the text statement type, wherein the classification model is trained based on a training dataset comprising a plurality of training terms, wherein one or more of the plurality of training terms is masked in the training dataset based on a respective frequency each training term appears among a plurality of terms in the plurality of text transcripts and whether the respective frequency exceeds a threshold;
receive, by the application based on the first text statement and the plurality of additional text statements, a first text transcript of the plurality of text transcripts;
identify, by the application based on a second heuristic of the plurality of heuristics, a first text transcript statement in the first text transcript, wherein the first text transcript statement is of the text statement type;
generate a graphical indication that the first text transcript statement is of the text statement type;
display at least the first text transcript statement and the graphical indication on a display;
the instructions further causing the processor to:
  determine, by the application based on a third heuristic of the plurality of heuristics, a plurality of seed words related to the text statement type; and generate, by the application based on the clustering algorithm and the plurality of seed words, the plurality of additional text statements of the text statement type; and the instructions further causing the processor to, prior to receiving the input:
    receive, by the application, the training dataset comprising the plurality of training terms;
    determine, by the application, a respective frequency each training term appears among the plurality of terms in the plurality of text transcripts;
    classify, by the application, a first subset of the plurality of training terms as being associated with the text statement type based on the respective frequencies of the first subset exceeding the threshold;
    classify, by the application, a second subset of the plurality of training terms as not being associated with the text statement type based on the respective frequencies of the second subset not exceeding the threshold; and
    mask the first subset of the plurality of training terms from the training dataset.

12. The computing apparatus of claim 11, wherein the first text transcript statement is further identified based on one or more of: (i) a length of the first text transcript statement, (ii) whether a predetermined phrase is present in the first text transcript statement, (iii) whether the first text transcript statement is associated with a customer or a customer support agent, (iv) a sentiment score computed for the first text transcript statement, and (v) whether a term of the first text transcript statement is associated with a negative sentiment.

13. The computing apparatus of claim 11, wherein the text statement types comprise one or more of: (i) a reason a customer associated with the text transcript contacted a customer support agent, (ii) a call resolution associated with the customer support agent, (iii) a personal story associated with the customer, and (iv) a negative statement made by the customer, wherein the first text transcript is identified based on one or more statements of the first text transcript matching the first text statement or at least one of the plurality of additional text statements, wherein the graphical indication comprises one or more of: (i) a symbol, (ii) a highlighting effect applied to the first text transcript statement, (iii) a bold effect applied to the first text transcript statement, or (iv) an italics effect applied to the first text transcript statement.

14. The computing apparatus of claim 11, wherein the text statement type is defined as being separate from a statement in the plurality of text transcripts.

\* \* \* \* \*